US012663831B2

(12) United States Patent     (10) Patent No.:   US 12,663,831 B2

Tian et al.     (45) Date of Patent:   Jun. 23, 2026

(54) DOCKING SYSTEM FOR AN ELECTRONIC DEVICE ASSEMBLY

(71) Applicant: Hand Held Products, Inc., Charlotte, NC (US)

(72) Inventors: Hang Tian, Charlotte, NC (US); Yihua Niu, Charlotte, NC (US); Yijing Hou, Charlotte, NC (US); Xiaofeng Wang, Charlotte, NC (US); Huijuan Meng, Charlotte, NC (US)

(73) Assignee: Hand Held Products, Inc., Charlotte, NC (US)

( * ) Notice: Subject to any disclaimer, the term of this patent is extended or adjusted under 35 U.S.C. 154(b) by 127 days.

(21) Appl. No.: 18/631,569

(22) Filed: Apr. 10, 2024

(65) Prior Publication Data

US 2024/0353897 A1     Oct. 24, 2024

(30) Foreign Application Priority Data

Apr. 24, 2023    (CN) .......................... 202310450963.0

(51) Int. Cl.
*G06F 1/16*       (2006.01)
(52) U.S. Cl.
CPC .................................. *G06F 1/1632* (2013.01)
(58) Field of Classification Search
CPC .... G06F 1/1632; G06F 1/1626; G06F 1/1683; G06F 1/1654; H01R 35/04; H01R 12/7058; H01R 12/716; H01R 13/2414; H01R 13/631; H01R 24/40; H01R 24/50
See application file for complete search history.

(56) References Cited

U.S. PATENT DOCUMENTS

| | | | | |
|---|---|---|---|---|
| 4,527,847 | A | * | 7/1985 | Rinker ................... H01R 35/04 |
| | | | | 439/446 |
| 10,101,770 | B2 | | 10/2018 | Schatz et al. |
| 2017/0117664 | A1 | * | 4/2017 | Yoshigi ............ H01R 13/62977 |
| 2019/0052739 | A1 | * | 2/2019 | Thiers ................. H04M 1/0274 |

(Continued)

FOREIGN PATENT DOCUMENTS

| | | |
|---|---|---|
| CN | 214008754 U | 8/2021 |
| GB | 2543118 B | 11/2017 |
| WO | WO-2017191430 A1 * | 11/2017 ............. H01R 24/86 |

OTHER PUBLICATIONS

Honeywell, "IH25 RFID Handheld Reader", retrieved from the Internet at URL: <https://automation.honeywell.com/us/en/products/productivity-solutions/mobile-computers/rfid/readers/ih25-rfid-handheld-reader> on Nov. 4, 2024, 2 pages.

*Primary Examiner* — Sagar Shrestha
*Assistant Examiner* — Peter Krim
(74) *Attorney, Agent, or Firm* — Alston & Bird LLP

(57)        ABSTRACT

A docking system for an electronic device assembly is provided. The docking system can include a first assembly and a second assembly. The first assembly can include a base and a first plurality of electrical connections that extend through the base. The second assembly can be configured to be removably coupled to the first assembly. The second assembly can include a turntable that is configured to rotate from a first position to a second position, a second plurality of electrical connections that extend through the turntable, and an electronic assembly that includes a printed circuit board assembly (PCBA) that is coupled to the turntable such that the PCBA is rotatable with the turntable.

17 Claims, 4 Drawing Sheets

(56) References Cited

U.S. PATENT DOCUMENTS

2021/0027031 A1    1/2021  Lim et al.
2022/0232957 A1    7/2022  Dunbar et al.
2023/0333589 A1*  10/2023  Lee ........................ F16M 11/08

* cited by examiner

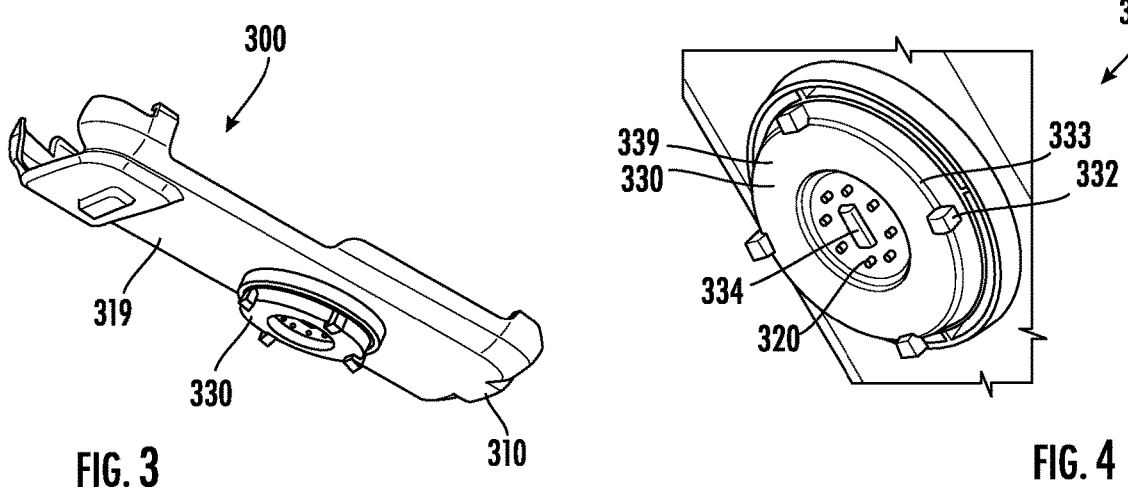
FIG. 3
FIG. 4
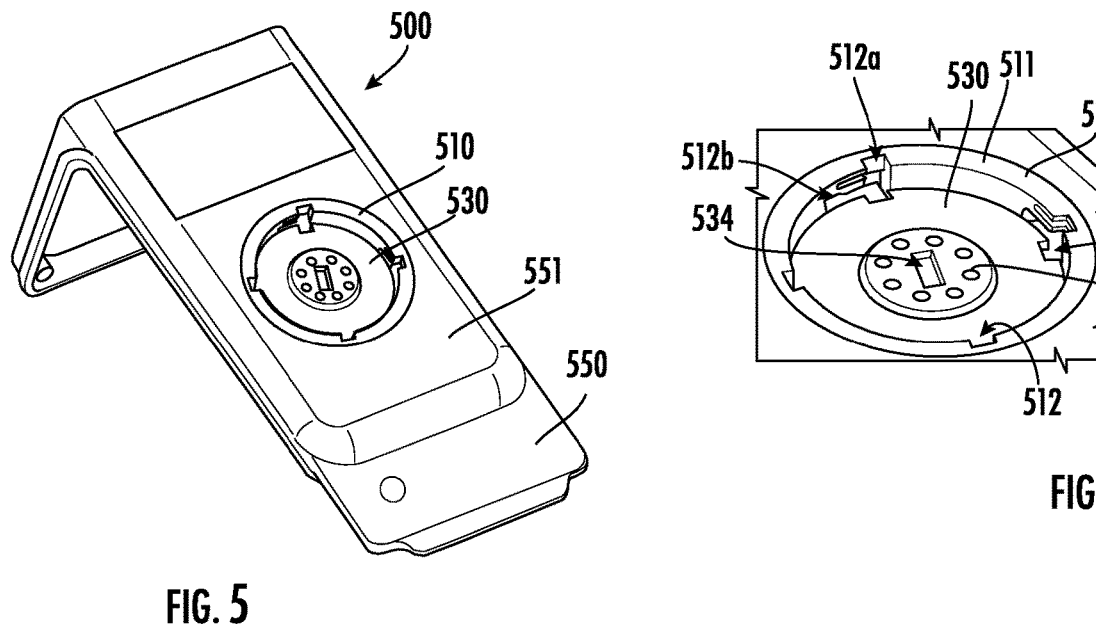
FIG. 5
FIG. 6

DOCKING SYSTEM FOR AN ELECTRONIC DEVICE ASSEMBLY

CROSS-REFERENCE TO RELATED APPLICATIONS

This application claims priority pursuant to 35 U.S.C. 119 (a) to Chinese Application No. 202310450963.0, filed Apr. 24, 2023, which application is incorporated herein by reference in its entirety.

TECHNICAL FIELD

The present application relates generally to docking systems. More specifically, the present application relates to docking systems for electronic device assemblies.

BACKGROUND

Radio Frequency Identification (RFID) technology is often used with visualization devices, such as personal digital assistants (PDAs), to track RFID tags that are attached to objects. RFID technology is used with PDAs in various industries such as healthcare, logistics, and retail. Often, the RFID device is coupled to the PDA and RFID information is transmitted to the PDA through BLUETOOTH or data wire for processing by the PDA. Maintaining the electrical connection between the RFID device and the PDA is important.

For some applications, it may be desirable for the PDA to be easily attached to and detached from the RFID device. As such, docking systems have been provided that allow the PDA to be docked and undocked from the RFID device. However, these existing docking systems often result in poor electrical contact between electrical connections of the RFID device and the PDA device. Also, these existing docking systems often result in the rapid wear of the electrical connections when docking and undocking requires relative motion between the electrical connection.

The inventors have identified numerous deficiencies and problems with the existing technologies in this field. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

In general, embodiments of the present disclosure provided herein include systems and apparatuses to provide for improved docking systems for electronic device assemblies.

In various aspects, a docking system for an electronic device assembly is provided. The docking system can include a first assembly and a second assembly. The first assembly can include a base and a first plurality of electrical connections that extend through the base. The second assembly can be configured to be removably coupled to the first assembly. The second assembly can include a turntable that is configured to rotate from a first position to a second position, a second plurality of electrical connections that extend through the turntable, and an electronic assembly that includes a printed circuit board assembly (PCBA) that is coupled to the turntable such that the PCBA is rotatable with the turntable.

In various examples, the first plurality of electrical connections are pogo pins or contact pads and/or the second plurality of electrical connections are pogo pins or contact pads.

In various examples, the turntable of the second assembly is configured to be rotated by the base of the first assembly.

In various examples, the first plurality of electrical connections of the first assembly remain stationary relative to the second plurality of electrical connections of the second assembly when the turntable is rotated from the first position to the second position.

In various examples, the second assembly includes a frame that encircles at least a portion of the base of the first assembly and encircles at least a portion of the turntable of the second assembly when the second assembly is coupled to the first assembly.

In various examples, the base of the first assembly includes a plurality of bosses and the frame of the second assembly includes a plurality of guiding grooves. Each of the plurality of bosses can be configured to slide within a corresponding guiding groove of the plurality of guiding grooves of the frame.

In various examples, the base of the first assembly includes a plurality of bosses and the turntable of the second assembly includes a plurality of guiding grooves. Each of the plurality of bosses can be configured to be positioned within a corresponding guiding groove of the plurality of guiding grooves of the turntable when the first assembly is coupled to the second assembly.

In various examples, the base of the first assembly includes a plurality of bosses and the frame of the second assembly includes a plurality of snap features. Each of the plurality of bosses of the base can be configured to interact with a corresponding snap feature when the turntable is rotated from the first position to the second position.

In various examples, the base of the first assembly includes a first mating feature and the turntable of the second assembly includes a second mating feature. The first mating feature of the base can be configured to mate with the second mating feature of the turntable when the second assembly is coupled to the first assembly.

In various examples, the second assembly includes a frame that includes a positioning flange. The positioning flange can include a first positioning groove and a second positioning groove. The turntable can include a positioning boss that is configured to be positioned in the first positioning groove with the turntable is in the first position and in the second positioning groove when the turntable is in the second position.

In various aspects, an electronic device assembly is provided. The electronic device assembly can include a first electronic device, a second electronic device, and a docking system for coupling, directly or indirectly, the first electronic device with the second electronic device. The docking system can include a first assembly and a second assembly. The first assembly can include a base and a first plurality of electrical connections that extend through the base, wherein the first plurality of electrical connections are in electrical communication with the first electronic device. The second assembly can be configured to be removably coupled to the first assembly. The second assembly can include a turntable that is configured to rotate from a first position to a second position. The second plurality of electrical connections can extend through the turntable wherein the second plurality of electrical connections are in electrical communication with the first electronic device. The second assembly can include an electronic assembly that includes a printed circuit board assembly (PCBA) that is coupled to the turntable such that the PCBA is rotatable with the turntable.

In various examples, the first plurality of electrical connections are pogo pins or contact pads and/or the second plurality of electrical connections are pogo pins or contact pads.

In various examples, the turntable of the second assembly is configured to be rotated by the base of the first assembly.

In various examples, the first plurality of electrical connections of the first assembly remain stationary relative to the second plurality of electrical connections of the second assembly when the turntable is rotated from the first position to the second position.

In various examples, the second assembly includes a frame that encircles at least a portion of the base of the first assembly and encircles at least a portion of the turntable of the second assembly when the second assembly is coupled to the first assembly.

In various examples, the base of the first assembly includes a plurality of bosses and the frame of the second assembly includes a plurality of guiding grooves. Each of the plurality of bosses can be configured to slide within a corresponding guiding groove of the plurality of guiding grooves of the frame.

In various examples, the base of the first assembly includes a plurality of bosses and the turntable of the second assembly includes a plurality of guiding grooves. Each of the plurality of bosses can be configured to be positioned within a corresponding guiding groove of the plurality of guiding grooves of the turntable when the first assembly is coupled to the second assembly.

In various examples, the base of the first assembly includes a plurality of bosses and the frame of the second assembly includes a plurality of snap features. Each of the plurality of bosses of the base can be configured to interact with a corresponding snap feature when the turntable is rotated from the first position to the second position.

In various examples, the base of the first assembly includes a first mating feature and the turntable of the second assembly includes a second mating feature. The first mating feature of the base can be configured to mate with the second mating feature of the turntable when the second assembly is coupled to the first assembly.

In various examples, the second assembly includes a frame that includes a positioning flange. The positioning flange can include a first positioning groove and a second positioning groove. The turntable can include a positioning boss that is configured to be positioned in the first positioning groove when the turntable is in the first position and in the second positioning groove when the turntable is in the second position.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

Figures 1, 2:
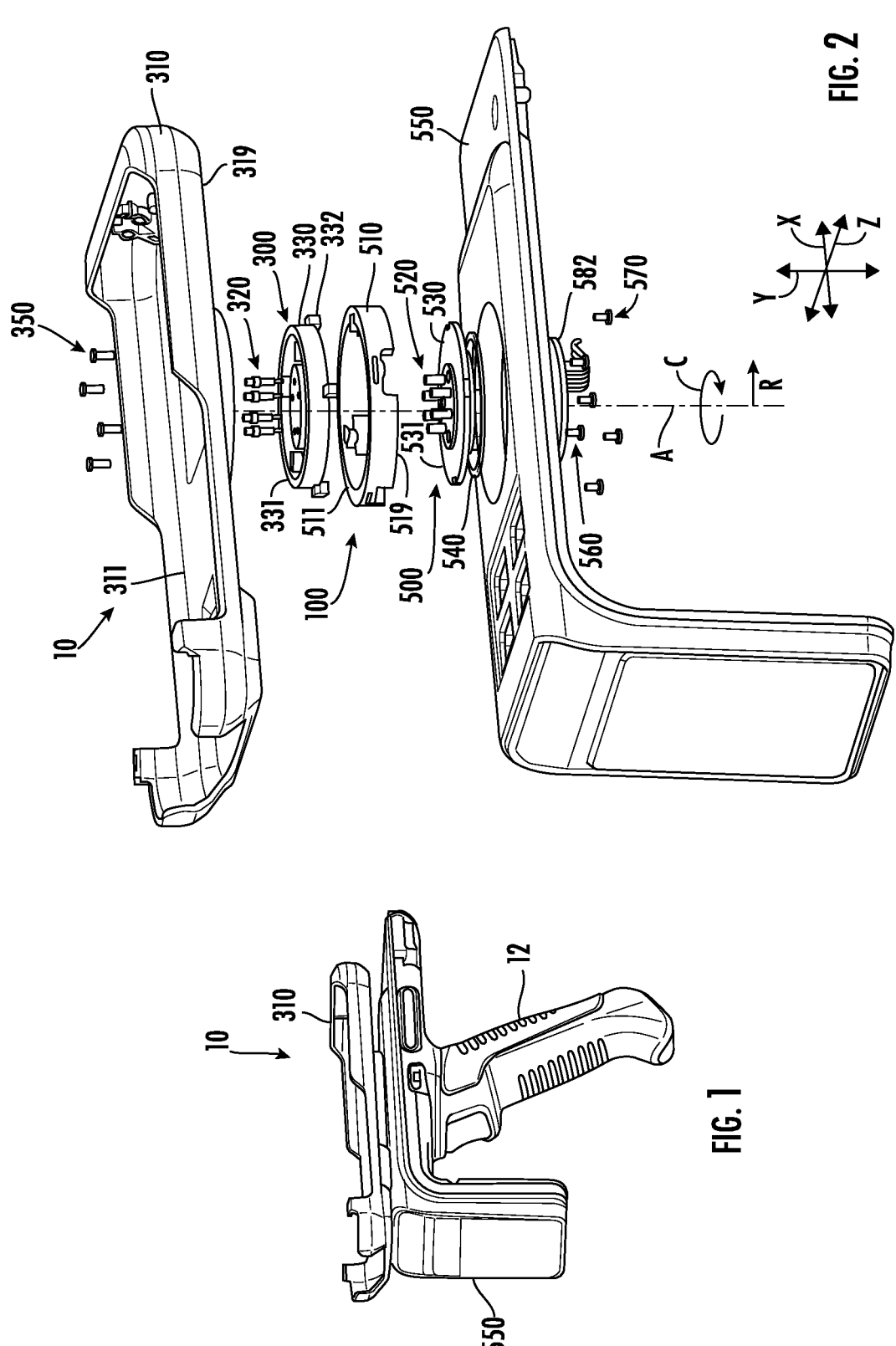

Having thus described certain example embodiments of the present disclosure in general terms above, non-limiting and non-exhaustive embodiments of the subject disclosure are described with reference to the following figures, which are not necessarily drawn to scale and wherein like reference numerals refer to like parts throughout the various views unless otherwise specified. The components illustrated in the figures may or may not be present in certain embodiments described herein. Some embodiments may include fewer (or more) components than those shown in the figures.

FIG. 1 provides a perspective side view of an electronic device assembly, in accordance with an example embodiment.

FIG. 2 provides an exploded side view of a portion of the electronic device assembly of FIG. 1, in accordance with an example embodiment.

FIG. 3 provides a perspective side view of a first assembly of a docking system of the electronic device assembly of FIG. 1, in accordance with an example embodiment, in accordance with an example embodiment.

FIG. 4 provides a perspective bottom view of a portion of the first assembly of FIG. 3, in accordance with an example embodiment.

FIG. 5 provides a perspective top view of a second assembly of a docking system of the electronic device assembly of FIG. 1, in accordance with an example embodiment, in accordance with an example embodiment.

FIG. 6 provides a perspective top view of a portion of the second assembly of FIG. 5, in accordance with an example embodiment.

Figure 7:
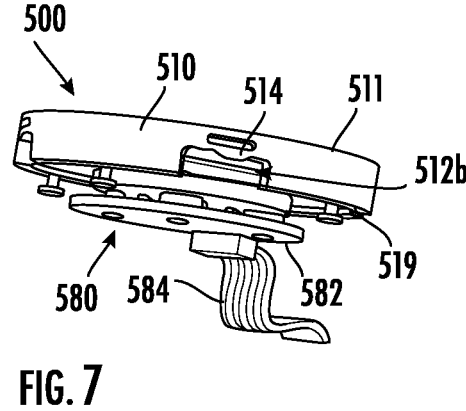

FIG. 7 provides a perspective side view of a portion of the second assembly of FIG. 5, in accordance with an example embodiment.

Figure 8:
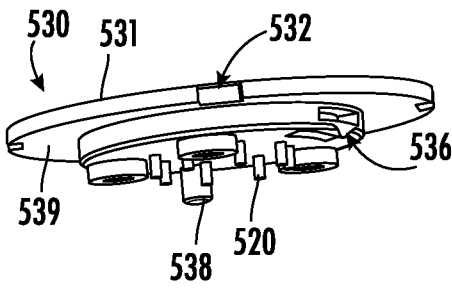

FIG. 8 provides perspective side view of a turntable of the second assembly of FIG. 5, in accordance with an example embodiment.

Figure 9:
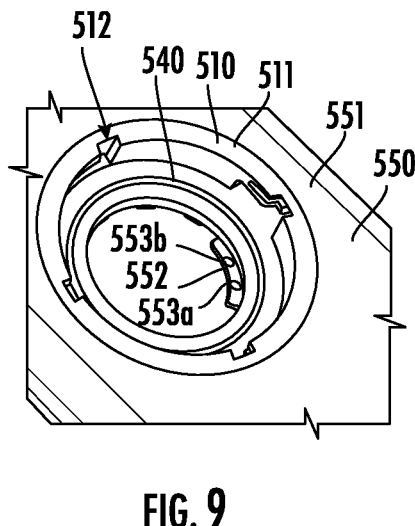

FIG. 9 provides a perspective top view of a portion of the second assembly of FIG. 5, in accordance with an example embodiment.

Figure 10:
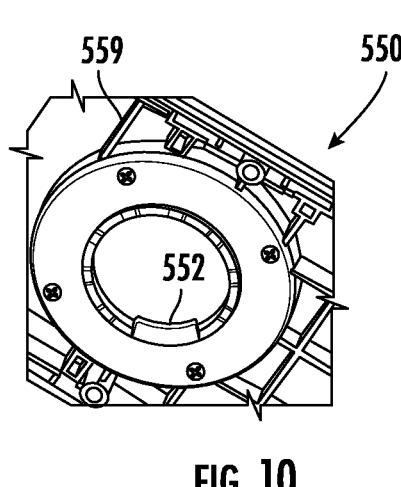

FIG. 10 provides a perspective bottom view of a front cover of the second assembly of FIG. 5, in accordance with an example embodiment.

Figures 11A, 11B, 11C, 12A, 12B, 12C:
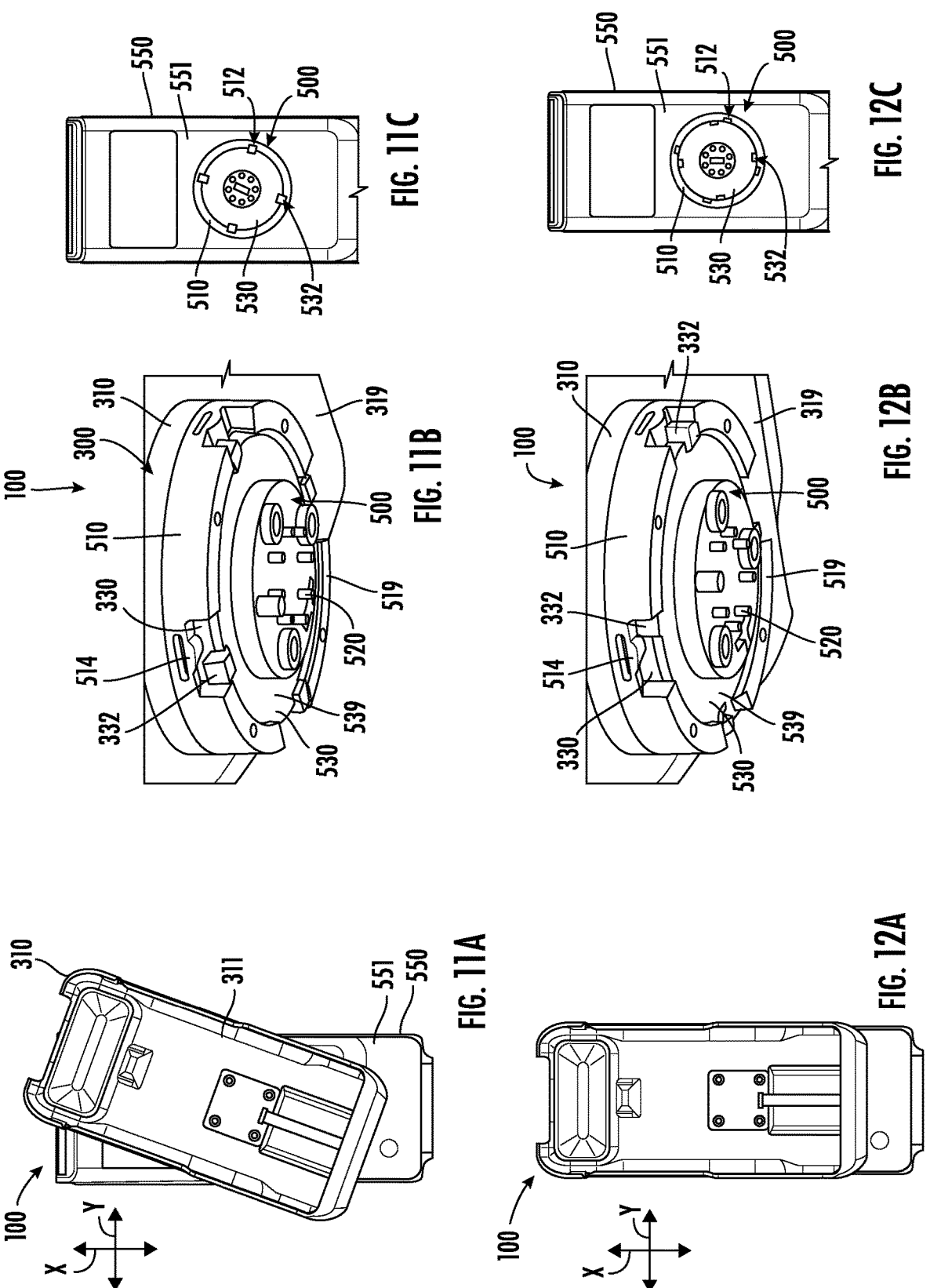

FIG. 11A provides a top view of the docking system of the electronic device assembly of FIG. 1 in a first position, in accordance with an example embodiment.

FIG. 11B provides a perspective view of the docking system of the electronic device assembly of FIG. 1 in a first position, in accordance with an example embodiment.

FIG. 11C provides a top view of the second assembly of the docking system of the electronic device assembly of FIG. 1 in a first position, in accordance with an example embodiment.

FIG. 12A provides a top view of the docking system of the electronic device assembly of FIG. 1 in a second position, in accordance with an example embodiment.

FIG. 12B provides a perspective view of the docking system of the electronic device assembly of FIG. 1 in a second position, in accordance with an example embodiment.

FIG. 12C provides a top view of the second assembly of the docking system of the electronic device assembly of FIG. 1 in a second position, in accordance with an example embodiment.

DETAILED DESCRIPTION

One or more embodiments are now more fully described with reference to the accompanying drawings, wherein like reference numerals are used to refer to like elements throughout and in which some, but not all embodiments of the inventions are shown. In the following description, for purposes of explanation, numerous specific details are set forth in order to provide a thorough understanding of the various embodiments. It is evident, however, that the various embodiments can be practiced without these specific details. It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements.

As used herein, the term "exemplary" means serving as an example, instance, or illustration. Any aspect or design described herein as "exemplary" is not necessarily to be construed as preferred or advantageous over other aspects or designs. Rather, use of the word exemplary is intended to present concepts in a concrete fashion. In addition, while a particular feature may be disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the term "electrical communication" means that an electric current and/or an electric signal are capable of making the connection between the areas specified.

As used herein, the terms "coupled," "fixed," "attached to," and the like refer to both direct coupling, fixing, or attaching, as well as indirect coupling, fixing, or attaching through one or more intermediate components or features, unless otherwise specified herein.

As used herein, the term "removably coupled," and the like refers to two components that can be coupled and relatively easily decoupled with a force exerted by a user's hand without the use of a tool, such as a screwdriver.

As used herein, the term "positioned directly on" refers to a first component being positioned on a second component such that they make contact. Similarly, as used herein, the term "positioned directly between" refers to a first component being positioned between a second component and a third component such that the first component makes contact with both the second component and the third component. In contrast, a first component that is "positioned between" a second component and a third component may or may not have contact with the second component and the third component. Additionally, a first component that is "positioned between" a second component and a third component is positioned such that there may be other intervening components between the second component and the third component other than the first component.

Referring now to FIG. 1, a perspective view of an electronic device assembly 10 is provided, in accordance with an example embodiment. In various examples, the electronic device assembly 10 includes a first electronic device (not depicted) and a second electronic device 12. As depicted, the second electronic device 12 can be a radio frequency identification (RFID) reader. The first electronic device can be a personal digital assistant (PDA) (not depicted). The electronic device assembly 10 can include a bracket 310 that is configured to be coupled to and/or house the first electronic device. The electronic device assembly 10 can include a front cover 550 that can be a portion of the second electronic device 12 (e.g., a housing of the second electronic device 12).

Even though the first electronic device is described as a PDA and the second electronic device 12 is described and depicted as an RFID reader, it should be understood that the present invention for a docking system 100 can be used for any types of electronic devices. For example, one of the first electronic device or the second electronic device 12 can be a computer (e.g., a wearable, mountable, or handheld computer), a scanner (e.g., a wearable, mountable, or handheld scanner) or a charging station. Additionally, it should also be understood that the components of the present invention for a docking system 100 can be reversed such that the first electronic device is an RFID reader and the second electronic device 12 is a PDA. Generally, the present invention for a docking system 100 can be used to removably couple two electronic devices such that they are in electrical communication with each other when coupled.

Referring now to FIG. 2, a perspective, exploded view of the electronic device assembly 10 of FIG. 1 is provided, in accordance with an example embodiment. The electronic device assembly 10 can include a docking system 100 that is positioned, at least partially, between the first electronic device and the second electronic device 12. For example, and as depicted, the docking system 100 can be positioned, at least partially, between the bracket 310 that can be coupled to and/or house the first electronic device and the front cover 550 of the second electronic device 12.

The docking system 100 can define an X direction, a Y direction that is orthogonal to the X direction, and a Z direction that is orthogonal to the X direction and the Y direction. The docking system 100 can define an axis A that extends in the Y direction. The docking system 100 can define a circumferential direction C that extends around the axis A and radial directions R that extend from the axis. The docking system 100 can include a first assembly 300 and a second assembly 500. The first assembly 300 can be configured to be removably coupled to the second assembly 500, and vice-versa.

The first assembly 300 can include the bracket 310, which can be configured to house, at least partially, and/or to be coupled to the first electronic device. The bracket 310 can include a first side 311 and a second side 319 that is opposite to the first side 311. The first side 311 can face toward the first electronic device and the second side 319 can face away from the first electronic device.

The first assembly 300 can include a first plurality of electrical connections 320. Each of the electrical connections 320 can extend, partially or completely, through orifices in the bracket 310. As depicted, each of the electrical connections 320 can be configured as a pogo pin. For example, each of the electrical connections 320 can be a pogo pin that is an electrical connector mechanism that includes a spring, such as a helical spring, that applies an outward force to a plunger of the pogo pin.

In various examples, at least one of the electrical connections 320 can be configured as a contact pad. For example, at least one of the electrical connections 320 can be a contact pad that is an electrical connector mechanism that may transmit or receive electric current and/or electric signals from another electrical connector mechanism. The contact pad may be, or may include, a biasing device. For example, the contact pad may be, or may include, a cantilever spring, a leaf spring, a helical spring, etc. In various examples, the contact pad does not include a biasing device.

As will be discussed further, each of the electrical connections 320 of the first assembly 300, which can be pogo pins, contact pads, or a combination thereof, can be configured to be in electrical communication with a corresponding electrical connection 520 of a second assembly 500 when the first assembly 300 is coupled to the second assembly 500. The corresponding electrical connection 520 of the second assembly 500 may be a pogo pin or a contact pad.

As will be appreciated, configuring at least one of the electrical connections 320 as pogo pins has various benefits. For example, pogo pins may counteract unwanted movement which might otherwise cause an intermittent electrical connection.

The first assembly 300 can include a base 330. The base 330 can include a first side 331 and an opposite second side 339. The base 330 can be generally cylinder shaped and can fit, at least partially, within a circular orifice of the bracket 310. Referring briefly to FIG. 3 and FIG. 4, each of the electrical connections 320 of the first assembly 300 can extend through the base 330. The second side 339 of the base 330 can include a first mating feature 334. As will be discussed further, the first mating feature 334 of the base 330 can be configured to mate with a second mating feature 534 of a turntable 530 (FIG. 6) of the second assembly 500. The first mating feature 334 can be generally rectangular and can protrude from a body of the first mating feature 334. The second mating feature 534 of the turntable 530 of the second assembly 500 can be generally rectangular and can be a cavity that is formed in a body of the turntable 530.

The base 330 can include a plurality of bosses 332. For example, and as depicted in FIG. 4, the base 330 can include four bosses 332 that are positioned on the second side 339 of the base 330. In various examples, the base 330 can include two, three, five, six, or more bosses 332. As will be discussed further, each boss 332 can be configured to engage with a corresponding guiding groove 512 of a frame 510 (FIG. 6) of the second assembly 500. In various examples, each boss 332 can be configured to engage with a corresponding guiding groove 532 (FIG. 6) of the turntable 530.

Each boss 332 can extend radially outward from a rim 333 of the base 330. In various examples, each boss 332 can extend away from the second side 339 of the base 330 in the Y direction. Each boss 332 can be generally cuboid-shaped. Each boss 332 may extend only a small portion around the rim 333 of the base 330. For example, each boss 332 may extend less than ten degrees, such as less than five degrees, such as less than three degrees circumferentially around the rim 333 of the base 330.

Referring back to FIG. 2, the first assembly 300 can include fasteners 350. The fasteners 350 can be configured as screws. Each of the fasteners 350 can extend through the bracket 310 and at least partially through the base 330. The fasteners 350 can couple the base 330 to the bracket 310 such that the base 330 is prevented from moving in relation to the bracket 310.

The second assembly 500 can include a frame 510. The frame 510 can be generally ring-shaped and can have a first side 511 and an opposite second side 519. The frame 510 can be coupled to the front cover 550 with a plurality of fasteners 570 (e.g., screws). As such, the frame 510 can be configured to be stationary in relation to the front cover 550.

Referring briefly to FIG. 6, the frame 510 can include guiding grooves 512. Each guiding grooves 512 can be configured to receive a corresponding boss 332 of the base 330. Each guiding groove 512 can have a first portion 512a that extends in the Y direction from the first side 511 of the frame 510. Each guiding groove 512 can have a second portion 512b that extends in the circumferential direction Con, or proximate to, the second side 519 of the frame 510. The first portion 512a of the guiding groove 512 that extends in the Y direction can be connected to the second portion 512b of the guiding groove 512 that extends in the circumferential direction C.

Referring briefly to FIG. 7, the frame 510 can include one or more snap features 514. Each snap feature 514 can be lobe shaped. For example, the snap feature 514 can be a rounded projection that extends from a body of the frame 510. The snap feature 514 can extend away from the first side 511 of the frame 510 and in the Y direction. The snap feature 514 can extend into the second portion 512b of the guiding groove 512 that extends in the circumferential direction C. As will be discussed further, the boss 332 of the base 330 can be configured to slide along the first portion 512a of the guiding groove 512 in the Y direction and to and along the second portion 512b of the guiding groove 512 in the circumferential direction C. When sliding along the second portion 512b of the guiding groove 512, the corresponding boss 332 can move past the snap feature 514 when a sufficient circumferential force is exerted. When the boss 332 moves past the corresponding snap feature 514, the boss 332 interacts with the corresponding snap feature 514 and a "click" may be heard and/or tactically felt by a user that is exerting the circumferential force.

Referring back to FIG. 2, the second assembly 500 can include a turntable 530. The turntable 530 can be generally cylindrical and can include a first side 531 and an opposite second side 539. Referring briefly to FIG. 5 and FIG. 6, the turntable 530 can include a plurality of guiding grooves 532. Each of the guiding grooves 532 can be configured to allow a corresponding boss 332 of the base 330 to be positioned within the guiding groove 532. For example, each of the guiding grooves 532 of the turntable 530 can be a cutout on a rim of the turntable 530. Each of the guiding grooves 532 of the turntable 530 can be approximately the same size (e.g., within 100 mil, such as within 50 mil) as the corresponding boss 332 of the base 330 such that each boss 332 fits snugly within a corresponding guiding groove 532 of the turntable 530. The turntable 530 can also include a second mating feature 534. The second mating feature 534 can be configured to allow the first mating feature 334 of the base 330 to be positioned within the second mating feature 534. The second mating feature 534 can be approximately the same size (e.g., within 100 mil, such as within 50 mil) as the first mating feature 334 of the base 330 such that the first mating feature 334 fits snugly within the second mating feature 534. Even though described and depicted as being rectangular, the first mating feature 334 and the second mating feature 534 may be any shape that will cause the turntable 530 to be rotated by the base 330. For example, the turntable 530 and base 330 may be shaped as a square, triangle, pentagon, chevron, etc.

As will be discussed further, when the base 330 of the first assembly 300 is mated with the turntable 530 of the second assembly 500, the turntable 530 may rotate with the base 330. For example, when the base 330 is mated with the turntable 530 and the base 330 is rotated, the first mating feature 334 can exert a circumferential force on the second mating feature 534 of the turntable 530, and each boss 332 of the base 330 can exert a circumferential force on the radially extending sides of the corresponding guiding groove 532 of the turntable 530. The circumferential force exerted on the second mating feature 534 and/or the guiding groove 532 of the turntable 530 may cause the turntable 530 to rotate.

Referring back to FIG. 2, the second assembly 500 can include a second plurality of electrical connections 520. Each of the second plurality of electrical connections 520 can extend, partially or completely, through the turntable 530 in the Y direction. Each of the second plurality of electrical connections 520 can be configured as pogo pins, contact pads, or a combination thereof.

In various examples, at least one of the first plurality of electrical connections 320 or at least one of the second plurality of electrical connections 520 can be configured as a pogo pin whereas a corresponding electrical connection 320, 520 of the other of the first plurality of electrical connections 320 or the second plurality of electrical connections 520 can be configured as a contact pad.

In various examples, at least one of the first plurality of electrical connections 320 is configured as a pogo pin and a corresponding electrical connection 520 of the second plurality of electrical connections 520 is configured as a pogo pin.

In various examples, at least one of the first plurality of electrical connections 320 is configured as a contact pad and a corresponding electrical connection 520 of the second plurality of electrical connections 520 is configured as a contact pad.

Referring now to FIG. 7, a perspective view of the second assembly 500 is provided, in accordance with an example embodiment. In various examples, the second assembly 500 can include an electronic assembly 580. The electronic assembly 580 can include a printed circuit board assembly (PCBA) 582. The electronic assembly 580 can include one or more wires 584 that are coupled to the PCBA 582. The electronic assembly 580 can be in electrical communication with a mainboard of the second electronic device 12 (FIG. 1).

The second plurality of electrical connections 520 can be coupled to the electronic assembly 580 such that the second plurality of electrical connections 520 are in electrical communication with the electronic assembly 580. Referring back to FIG. 2, the second assembly 500 can include a plurality of fasteners 560 (e.g., screws) that are configured to couple the electronic assembly 580 to the turntable 530. As such, the electronic assembly 580 can be configured to rotate with the turntable 530. For example, the PCBA 582 can be configured to rotate with the turntable 530.

Referring now to FIG. 8, a perspective view of the turntable 530 of the second assembly 500 is provided, in accordance with an example embodiment. The turntable 530 can include one or more positioning pins 538. The one or more positioning pins 538 can be configured to ensure proper positioning of the turntable 530 in relation to the PCBA 582 when the second assembly 500 is assembled.

Referring now to FIGS. 8-10, the turntable 530 of the second assembly 500 can include one or more positioning boss 536. Each positioning boss 536 can extend away from a main body of the turntable 530 in the Y direction. Each positioning boss 536 can be lobe shaped. For example, each positioning boss 536 can be a rounded protrusion that extends from a body of the turntable 530. The front cover 550 of the second assembly 500 can include a positioning flange 552 that can extend radially inward from a body of the front cover 550. For example, and as depicted in FIGS. 9 and 10, the positioning flange 552 can extend circumferentially, at least partially, around an inner rim defined by an orifice in the front cover 550. The positioning flange 552 can include at least a first positioning groove 553a and a second positioning groove 553b that each extend in the radial direction. The positioning boss 536 of the turntable 530 can be configured to move from the first positioning groove 553a to the second positioning groove 553b when the turntable 530 moves from a first position to a second position. The positioning boss 536, the first positioning groove 553a, and the second positioning groove 553b can be configured to prevent an unintentional rotation of the turntable 530. For example, a certain amount of circumferential force may be required to move the positioning boss 536 of the turntable 530 from the first positioning groove 553a to the second positioning groove 553b. Therefore, the positioning flange 552 of the front cover 550 can be configured to prevent a rotational movement of the turntable 530 unless a certain amount of circumferential force is applied to the turntable 530.

The second assembly 500 can include a sealing ring 540 (FIG. 9). The sealing ring 540 can be positioned within a groove of the front cover 550. The sealing ring 540 can be annular and can be configured to provide a seal between the turntable 530 and the front cover 550.

Referring now to FIGS. 11A-12C, views of the electronic device assembly 10 are provided, in accordance with an example embodiment. More specifically, FIG. 11A depicts the electronic device assembly 10 in a first position, FIG. 11B depicts the docking system 100 of the electronic device assembly 10 in the first position, and FIG. 11C depicts the second assembly 500 of the docking system 100 of the electronic device assembly 10 in the first position. FIG. 12A depicts the electronic device assembly 10 in a second position, FIG. 12B depicts the docking system 100 of the electronic device assembly 10 in the second position, and FIG. 12C depicts the second assembly 500 of the docking system 100 of the electronic device assembly 10 in the second position. In various examples, and as depicted in FIGS. 11A-12C the first position is clockwise of the second position when viewed at a position on top of the first device. In various examples, the first position is counter-clockwise of the second position when viewed at a position on top of the first device.

As depicted in FIG. 11A, when a user desires to dock a first electronic device (not depicted) to a second electronic device 12 (FIG. 1), a user can position the first electronic device over and at an angle in relation to the second electronic device 12 (FIG. 1). For example, the bracket 310 and/or the first assembly 300 can be positioned over the second assembly 500 of the docking system 100 and at an angle in relation to the front cover 550 of the second electronic device 12 (FIG. 1). In various examples, and as depicted in FIG. 11A, the angle is approximately 20 degrees (e.g., greater than or equal to 10 degrees and less than or equal to 30 degrees). In various examples, the angle is greater than 5 degrees and up to 20 degrees. In various examples, the angle is greater than 20 degrees and up to 60 degrees.

Once the first electronic device is positioned over and at an angle in relation to the second electronic device 12, the user can push the first electronic device toward the second electronic device 12 (e.g., along the Y direction) so that each boss 332 of the base 330 of the first assembly 300 of the docking systems moves along the first portion 512a (FIG. 6) of a corresponding guiding groove 512 of the frame 510 of the second assembly 500 of the docking system 100. As depicted in FIG. 6 and FIG. 11C, each guiding groove 532 of the turntable 530 can align with the first portion 512a of the corresponding guiding groove 512 of the frame 510 along the Y direction when the turntable 530 is in the first position. Therefore, each boss 332 of the base 330 may also move along and into the corresponding guiding groove 532 of the turntable 530.

When each boss 332 of the base 330 of the first assembly 300 is positioned within the corresponding guiding groove 532 of the turntable 530 of the second assembly 500 and the corresponding guiding groove 532 of the turntable 530 is aligned in the Y direction with the corresponding first portion 512a of the corresponding guiding groove 512 of the frame 510, the first assembly 300 of the docking system 100 is in the first position. Once the first assembly 300 is in the first position, the first assembly 300 can be rotated to move to a second position. For example, a user can rotate the first electronic device and/or the bracket 310 that is coupled to the first electronic device to the second position. In various examples, the user can rotate the first electronic device and/or the bracket 310 counterclockwise to the second position. Because the base 330, which includes the bosses 332, is coupled to the first electronic device and/or the bracket 310, the base 330 and the bosses 332 may rotate with the first electronic device and/or the bracket 310. Rotating the base 330 causes the bosses 332 to move along the second portion 512b of the corresponding guiding grooves 512 of the frame 510 of the second assembly 500 of the docking system 100, which extends circumferentially. For example, and as depicted in FIGS. 11B and 12B, each boss 332 can move counterclockwise from a first position (FIG. 11B) to a second position (FIG. 12B) when viewed from a position on top of the docking system 100 (FIG. 11B and FIG. 12B depict a perspective bottom view). When the base 330 moves from the first position to the second position, each boss 332 may interact with a corresponding snap feature 514 to provide an audible or tactile click.

When the base 330 moves from the first position to the second position, the one or more positioning boss 536 of the turntable 530 may interact with the first positioning groove 553a and the second positioning groove 553b of the positioning flange 552 of the front cover 550. For example, when the positioning boss 536 of the turntable 530 is in the first position, the positioning boss 536 may be positioned within the first positioning groove 553a such that the unintentional rotation of the turntable 530 is prevented. For example, the positioning boss 536 of the turntable 530 and the first positioning groove 553a of the positioning flange 552 may be configured to prevent a rotation of the turntable 530 unless a certain circumferential force is exceeded (e.g., a force relatively easily exerted by a human hand). The positioning boss 536 of the turntable 530 and the first positioning groove 553a of the positioning flange 552 may prevent unintentional rotation of the turntable 530 when the electronic device assembly 10 is being used, tilted, translated, or otherwise moved.

In various examples, and as depicted in FIG. 12C, when the turntable 530 is in the second position, the guiding grooves 532 of the turntable 530 are not aligned with the first portion 512a of the corresponding guiding groove 512 of the frame 510 in the Y direction. As such, the base 330 of the first assembly 300 is prevented from moving in the Y direction when the bosses 332 of the base 330 are positioned within the guiding groove 532 of the turntable 530 and the turntable 530 is in the second position.

Notably, the turntable 530 of the second assembly 500 rotates with the base 330 of the first assembly 300. This may be beneficial because the electrical connections 320 of the first assembly 300 remain stationary relative to the electrical connections 520 of the second assembly 500 as the turntable 530 and the base 330 rotate. As will be appreciated, if the electrical connections 320, 520 moved in relation to each other, friction between the electrical connections 320, 520 may cause the electrical connections 320, 520 to eventually fail. Therefore, configuring the docking system 100 such that the electrical connections 320, 520 remain stationary relative to each other when the base 330 of the first assembly 300 and the turntable 530 of the second assembly 500 are moved from the first position to the second position, and vice-versa, may prevent wear and/or failure of the electrical connections 320 of the first assembly 300 and the electrical connections 520 of the second assembly 500.

Also, notably, the electronic assembly 580 (FIG. 7), which may include a PCBA 582 and/or wires 584, may rotate with the turntable 530 of the second assembly 500 as it rotates from the first position to the second position, and vice-versa. Configuring the docking system 100 such that the electronic assembly 580 rotates with the turntable 530 may prevent wear and/or failure of one or more components of the electronic assembly 580, such as the PCBA 582.

Referring still to FIGS. 11A-12C, when a user desires to undock a first electronic device (not depicted) from a second electronic device 12 (FIG. 1), the user can reverse the steps as already discussed for docking the first electronic device to the second electronic device 12.

CONCLUSION

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the appended claims below. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A docking system for an electronic device assembly, the docking system comprising:

a first assembly comprising:

a base; and a first plurality of electrical connections that extend through the base; and a second assembly that is configured to be removably coupled to the first assembly, the second assembly comprising:

a turntable that is configured to rotate from a first position to a second position;

a second plurality of electrical connections that extend through the turntable; and an electronic assembly comprising a printed circuit board assembly (PCBA) that is coupled to the turntable such that the PCBA is rotatable with the turntable, wherein:

the second assembly comprises a frame that encircles at least a portion of the base of the first assembly and encircles at least a portion of the turntable of the second assembly when the second assembly is coupled to the first assembly, the base of the first assembly comprises a plurality of bosses and the frame of the second assembly comprises a plurality of guiding grooves, and each of the plurality of bosses are configured to slide within a corresponding guiding groove of the plurality of guiding grooves of the frame.

2. The docking system of claim 1, wherein the first plurality of electrical connections are pogo pins or contact pads and/or or the second plurality of electrical connections are pogo pins or contact pads.

3. The docking system of claim 1, wherein the turntable of the second assembly is configured to be rotated by the base of the first assembly.

4. The docking system of claim 1, wherein the first plurality of electrical connections of the first assembly remain stationary relative to the second plurality of electrical connections of the second assembly when the turntable is rotated from the first position to the second position.

5. The docking system of claim 1, wherein the base of the first assembly comprises a plurality of bosses and the turntable of the second assembly comprises a plurality of guiding grooves, wherein each of the plurality of bosses are configured to be positioned within a corresponding guiding groove of the plurality of guiding grooves of the turntable when the first assembly is coupled to the second assembly.

6. The docking system of claim 1, wherein the base of the first assembly comprises a plurality of bosses and the frame of the second assembly comprises a plurality of snap features, wherein each of the plurality of bosses of the base are configured to interact with a corresponding snap feature when the turntable is rotated from the first position to the second position.

7. The docking system of claim 1, wherein the base of the first assembly comprises a first mating feature and the turntable of the second assembly comprises a second mating feature, wherein the first mating feature of the base is configured to mate with the second mating feature of the turntable when the second assembly is coupled to the first assembly.

8. The docking system of claim 1, wherein the second assembly comprises a frame that comprises a positioning flange, wherein the positioning flange comprises a first positioning groove and a second positioning groove, and wherein the turntable comprises a positioning boss that is configured to be positioned in the first positioning groove with the turntable is in the first position and in the second positioning groove when the turntable is in the second position.

9. An electronic device assembly comprising:

a first electronic device;

a second electronic device; and a docking system for coupling, directly or indirectly, the first electronic device with the second electronic device, the docking system comprising:

a first assembly comprising:

a base; and a first plurality of electrical connections that extend through the base, wherein the first plurality of electrical connections are in electrical communication with the first electronic device; and a second assembly that is configured to be removably coupled to the first assembly, the second assembly comprising:

a turntable that is configured to rotate from a first position to a second position;

a second plurality of electrical connections that extend through the turntable wherein the second plurality of electrical connections are in electrical communication with the first electronic device; and an electronic assembly comprising a printed circuit board assembly (PCBA) that is coupled to the turntable such that the PCBA is rotatable with the turntable, wherein the second assembly comprises a frame that encircles at least a portion of the base of the first assembly and encircles at least a portion of the turntable of the second assembly when the second assembly is coupled to the first assembly, wherein the base of the first assembly comprises a plurality of bosses and the frame of the second assembly comprises a plurality of guiding grooves, wherein each of the plurality of bosses are configured to slide within a corresponding guiding groove of the plurality of guiding grooves of the frame.

10. The electronic device assembly of claim 9, wherein the first plurality of electrical connections are pogo pins or contact pads or the second plurality of electrical connections are pogo pins or contact pads.

11. The electronic device assembly of claim 9, wherein the turntable of the second assembly is configured to be rotated by the base of the first assembly.

12. The electronic device assembly of claim 9, wherein the first plurality of electrical connections of the first assembly remain stationary relative to the second plurality of electrical connections of the second assembly when the turntable is rotated from the first position to the second position.

13. The electronic device assembly of claim 9, wherein the base of the first assembly comprises a plurality of bosses and the turntable of the second assembly comprises a plurality of guiding grooves, wherein each of the plurality of bosses are configured to be positioned within a corresponding guiding groove of the plurality of guiding grooves of the turntable when the first assembly is coupled to the second assembly.

14. The electronic device assembly of claim 9, wherein the base of the first assembly comprises a plurality of bosses and the frame of the second assembly comprises a plurality of snap features, wherein each of the plurality of bosses of the base are configured to interact with a corresponding snap feature when the turntable is rotated from the first position to the second position.

15. The electronic device assembly of claim 9, wherein the base of the first assembly comprises a first mating feature and the turntable of the second assembly comprises a second mating feature, wherein the first mating feature of the base is configured to mate with the second mating feature of the turntable when the second assembly is coupled to the first assembly.

16. The electronic device assembly of claim 9, wherein the second assembly comprises a frame that comprises a positioning flange, wherein the positioning flange comprises a first positioning groove and a second positioning groove, and wherein the turntable comprises a positioning boss that is configured to be positioned in the first positioning groove when the turntable is in the first position and in the second positioning groove when the turntable is in the second position.

17. A docking system for an electronic device assembly, the docking system comprising:

a first assembly comprising:

a base; and a first plurality of electrical connections that extend through the base; and a second assembly that is configured to be removably coupled to the first assembly, the second assembly comprising:

a turntable that is configured to rotate from a first position to a second position;

a second plurality of electrical connections that extend through the turntable; and an electronic assembly comprising a printed circuit board assembly (PCBA) that is coupled to the turntable such that the PCBA is rotatable with the turntable, wherein:

the second assembly comprises a frame that encircles at least a portion of the base of the first assembly and encircles at least a portion of the turntable of the second assembly when the second assembly is coupled to the first assembly, the base of the first assembly comprises a plurality of bosses and the turntable of the second assembly comprises a plurality of guiding grooves, and each of the plurality of bosses are configured to be positioned within a corresponding guiding groove of the plurality of guiding grooves of the turntable when the first assembly is coupled to the second assembly.

* * * * *